April 23, 1929.  A. P. BRUSH  1,710,292

INTERNAL COMBUSTION ENGINE

Filed Feb. 14, 1927

Inventor
Alanson P. Brush

By Whittemore Hulbert Whittemore
Belknap

Attorneys

Patented Apr. 23, 1929.

1,710,292

UNITED STATES PATENT OFFICE.

ALANSON P. BRUSH, OF DETROIT, MICHIGAN.

INTERNAL-COMBUSTION ENGINE.

Application filed February 14, 1927. Serial No. 168,114.

The invention relates generally to internal combustion engines and has for its principal objects first increased efficiency and second, simplification in structure.

In the present state of the art a considerable amount of the heat developed by internal combustion is unavoidably absorbed by the walls of the cylinder and combustion chamber and must be dissipated without performance of any useful work. To effect the dissipation of the heat the engine casing must be either water jacketed or, in case of air cooling, must be provided with radiating fins or equivalent structure, thereby adding to the mass and the capacity of the wall to absorb heat.

To lessen the heat losses I have devised a construction for limiting the heat absorption of the retaining wall. This may be accomplished in various ways but as shown is effected by limiting the mass which is in direct thermal conductive relation to the inner surface of the wall.

It is a well known fact that the capacity of any material body to absorb heat is dependent on its mass and the specific heat of the substance. Therefore with the same substance the heat absorption is directly proportioned to mass. It is also well known that the specific heat of water is very high so that a water jacketed cylinder and combustion chamber has a large capacity for absorbing heat. Thus if it were possible to form the walls of the engine of very thin material out of heat conducting relation to any other substance, this would greatly limit the absorption of heat from the combustion gases and as the alternate introduction of explosive mixture would reabsorb heat from the walls there would be very little waste energy. It would of course be impossible to fulfill such conditions as the mechanical strength required for retaining the high pressure necessitates thicker walls.

To secure the thermal effect of the thin wall, together with the necessary mechanical strength I have devised a construction comprising an inner surface member and a mechanical support or reinforcement therefor. The construction is also such as to greatly limit the thermal conduction from the inner to the reinforcing member so that the heat absorption capacity of the wall is determined chiefly by the inner member. This construction may be applied either to the whole or any portion of the surface surrounding the combustion chamber but I have specifically shown its application only to the head of the piston.

Figure 1:
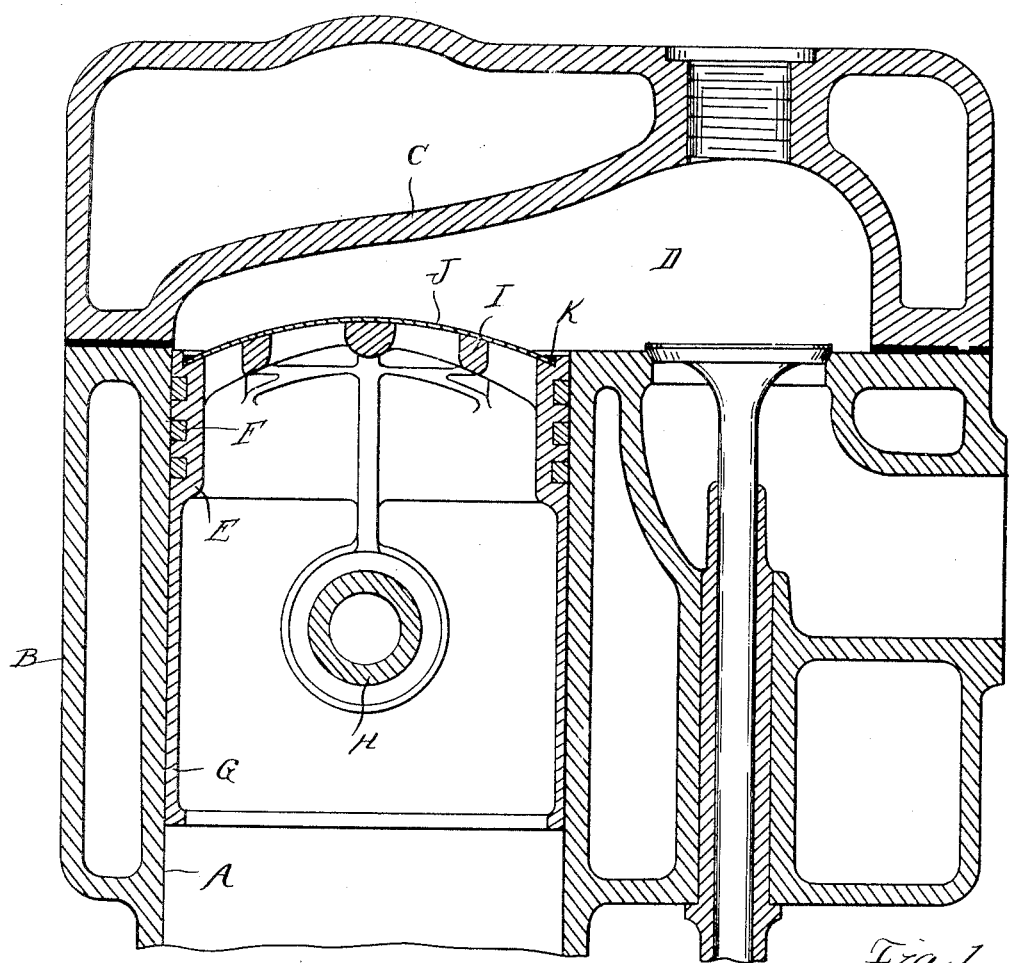
Figure 1 is a vertical central section through an internal combustion engine to which my improvement is applied.
Figure 2:
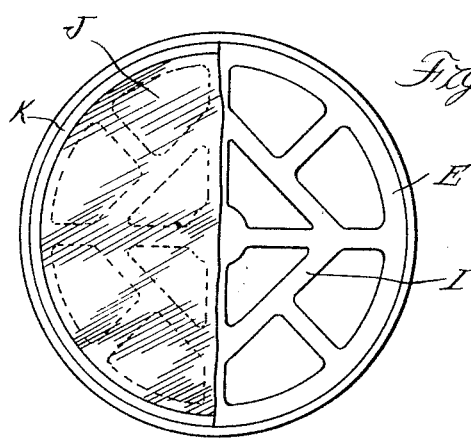
Figure 2 is a plan view of the reinforcement for the piston head.

A is a cylinder of an internal combustion engine which, as shown, is provided with the usual water jacket B and with the water jacketed head C for enclosing the combustion chamber D. E is the piston provided with the usual piston rings F and depending skirt G and wrist pin bearings H. The head of the piston is, however, of special construction as follows:

I is a grid preferably cast integral with the side walls, skirt and wrist pin bearings of the piston. This is so constructed as to divide the area of the piston head into a large number of openings of relatively small area. J is a thin sheet metal cover resting upon the grid I and marginally welded, brazed or otherwise secured to the body of the piston with a gas type joint as indicated at K. If desired, this cover may be made of some non-corrodible metal capable of withstanding high temperatures such, for instance, as some nickel chromium alloy.

With the construction as described in operation the heat which is usually absorbed from the explosion gases by the piston head is, with my construction, greatly limited as the thin cover wall J has but a limited capacity. This may result in raising the cover wall to a high temperature but the succeeding suction stroke of the engine will bathe this wall with cool gases and will again lower the temperature thereof. At points of bearing on the rim some heat will be transferred by conduction but the amount so lost is very small in comparison with the amount which would be conducted through an integral wall. It is obvious that the construction of the wall of the piston head may be applied to other portions of the explosion chamber but I deem it unnecessary to further illustrate or describe such developments. The essential idea underlying my invention is to so construct a portion or the whole of the area enclosing the combustion chamber as to limit the heat absorption from the combustion gases.

What I claim as my invention is:

1. In an internal combustion engine, a wall area for contacting with the combustion gases having a surface portion of thin gauge material and a reinforcement for carrying the stresses transmitted to the surface portion leaving a relatively large portion of the area exposed for dissipation of heat by radiation.

2. In an internal combustion engine, a wall area for contacting with the combustion gases comprising a thin sheet metal inner surface member and a grid reinforcement for said member leaving a relatively large portion of the area exposed for dissipation of heat by radiation.

3. In the operation of an internal combustion engine, the step of dissipating heat in the form of radiant energy directly from an inner wall of the combustion chamber.

4. In the operation of an internal combustion engine, the step of dissipating heat in the form of radiant energy directly from an inner wall of the combustion chamber of low heat absorption capacity.

In testimony whereof I affix my signature

ALANSON P. BRUSH.